(12) United States Patent
Corrao et al.

(10) Patent No.: US 10,752,337 B2
(45) Date of Patent: Aug. 25, 2020

(54) ASSEMBLY OF A MODULAR AND REPLACEABLE WING LEADING EDGE ASSEMBLY FOR EXTREMELY HIGH TEMPERATURE APPLICATIONS

(71) Applicant: THE BOEING COMPANY, Chicago, IL (US)

(72) Inventors: Giovanni Corrao, St. Charles, MO (US); Jonathan Embler, Tustin, CA (US); Nicholas B. Segobiano, St. Louis, MO (US); Marlana Behnke Goldsmith, St. Louis, MO (US)

(73) Assignee: The Boeing Company, Chicago, IL (US)

( * ) Notice: Subject to any disclaimer, the term of this patent is extended or adjusted under 35 U.S.C. 154(b) by 392 days.

(21) Appl. No.: 15/686,700

(22) Filed: Aug. 25, 2017

(65) Prior Publication Data

US 2019/0061907 A1    Feb. 28, 2019

(51) Int. Cl.

| | |
|---|---|
| *B64C 3/26* | (2006.01) |
| *B64G 1/58* | (2006.01) |
| *B64C 3/28* | (2006.01) |
| *B64F 5/00* | (2017.01) |
| *B64F 5/10* | (2017.01) |
| *B64G 1/14* | (2006.01) |
| *B64C 30/00* | (2006.01) |
| B64C 3/18 | (2006.01) |

(52) U.S. Cl.
CPC ............. *B64C 3/26* (2013.01); *B64C 3/28* (2013.01); *B64C 30/00* (2013.01); *B64F 5/00* (2013.01); *B64F 5/10* (2017.01); *B64G 1/14* (2013.01); *B64G 1/58* (2013.01); *B64C 3/185* (2013.01)

(58) Field of Classification Search
CPC .. B64C 3/185; B64C 3/26; B64C 3/28; B64C 3/36; B64C 30/00; B64C 2003/146; B64G 1/14; B64G 1/58
See application file for complete search history.

(56) References Cited

U.S. PATENT DOCUMENTS

| | | | | |
|---|---|---|---|---|
| 3,128,067 A | * | 4/1964 | Loegering | ................. B64C 3/14 244/117 A |
| 2009/0208284 A1 | * | 8/2009 | Funnell | ..................... B64C 3/28 403/374.3 |

* cited by examiner

*Primary Examiner* — Nicholas McFall
(74) *Attorney, Agent, or Firm* — Yee & Associates, P.C.

(57) ABSTRACT

A leading edge of a wing for an aircraft that is subject to a wide temperature range. The leading edge includes a plurality of leading edge sections arranged along the wing so as to define its leading edge. Two opposing ends of each section are removably mounted to a spar of the wing and wherein side ends of each section are slidably mounted to a T-seal so as to allow unimpeded expansion of each leading edge section into a gap defined between adjacent leading edge sections.

20 Claims, 11 Drawing Sheets

ASSEMBLY OF A MODULAR AND REPLACEABLE WING LEADING EDGE ASSEMBLY FOR EXTREMELY HIGH TEMPERATURE APPLICATIONS

BACKGROUND INFORMATION

1. Field

The present disclosure relates to methods and devices for design and assembly of a modular and replaceable wing leading edge assembly for extremely high temperature applications.

2. Background

Space vehicles are subject to extremely high temperatures when reentering the atmosphere of the Earth due to friction between the atmosphere and the hull of the spacecraft. The hull temperature that is reached varies depending on the shape of the spacecraft, the speed of the aircraft, and the angle at which the aircraft enters the atmosphere, and other factors. However, in some cases, the hull temperature of the spacecraft can briefly reach 6000° Fahrenheit or more. In comparison, the melting point of titanium, one of the strongest metals used in construction, is just over 3000° Fahrenheit.

Thus, thermal protection systems are used in reusable spacecraft to protect the spacecraft from the extreme heat of reentry. However, even special thermal materials can require replacement after a reentry. Thus, methods and devices are sought to reduce the cost and increase the ease of replacement of thermal protection systems on reusable spacecraft.

SUMMARY

The illustrative embodiments provide for a leading edge of a wing for an aircraft that is subject to a wide temperature range. The leading edge includes a plurality of leading edge sections arranged along the wing so as to define its leading edge. Two opposing ends of each section are removably mounted to a spar of the wing, and wherein the side ends of each section are slideably mounted to a T-seal so as to allow unimpeded expansion of each leading edge section into a gap defined between the adjacent leading edge sections.

The illustrative embodiments also provide for another leading edge of a wing of a spacecraft. The leading edge includes a curved section of material ending in a first terminal edge that generally opposes a second terminal edge. The curved section further including a first longitudinal edge that generally opposes a second longitudinal edge. The leading edge also includes a first connector fixedly attached to the curved section and terminating at about the first terminal edge. The first connector further including a first side connector facing the first longitudinal edge. The leading edge also includes a second connector connected to the first connector and extending past the first terminal edge. The leading edge also includes a third connector fixedly attached to the curved section and terminating at about the second terminal edge, the third connector further including a second side connector facing the first longitudinal edge. The leading edge also includes a fourth connector connected to the third connector and extending past the second terminal edge.

The illustrative embodiments also provide for a method of manufacturing or maintaining a leading edge of a spacecraft, the leading edge comprising: a curved section of material ending in a first terminal edge that generally opposes a second terminal edge, the curved section further including a first longitudinal edge that generally opposes a second longitudinal edge; a first connector fixedly attached to the curved section and terminating at about the first terminal edge, the first connector further including a first side connector facing the first longitudinal edge; a second connector connected to the first connector and extending past the first terminal edge; a third connector fixedly attached to the curved section and terminating at about the second terminal edge, the third connector further including a second side connector facing the first longitudinal edge; and a fourth connector connected to the third connector and extending past the second terminal edge. The method includes connecting the second connector to a first flange projecting from a spar of the spacecraft. The method also includes connecting the fourth connector to a second flange projecting from the spar of the spacecraft opposite the first flange.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account that older space shuttles currently employ a carboncarbon leading edge mechanically attached to a wing torque box which is intolerant of impact by ground debris or by bird strike. Thus, the illustrative embodiments provide for an all metal wing leading edge that is resistant to high thermal loads and is much more affordable than the standard ceramic heat resistant tile currently used on the space shuttle. The illustrative embodiments also provide for a wing leading edge modular assembly for high temperature applications including a one-piece skin and internal structural supports allowing easy installation and removal to the main wing torque box. By utilizing a combination of fixed and expandable joints, this modular assembly has the ability to accept thermal and aerodynamic growth without permanent deformation.

The illustrative embodiments recognize and take into account that the term "wide temperature range" means, to those of skill in the art, a temperature range which a reusable spacecraft experiences during the full operational cycle of the reusable spacecraft. Thus, a wide temperature range is generally known to be about negative 60° Fahrenheit sometimes found in the tropopause of the atmosphere at some point during launch, to about 6000° Fahrenheit experienced by the hull of a spacecraft during reentry into the atmosphere. An extreme temperature is likewise recognizable by those of ordinary skill in the art to be a temperature capable of creating inconsistencies in the underlying structure of a reusable spacecraft, had the spacecraft not had a thermal protection system. An "extreme temperature" or "high thermal load" is generally known to be in the range of about 1000° Fahrenheit to about 6000° Fahrenheit, or sometimes more in certain rare circumstances.

The wing leading edge of the illustrative embodiments is capable of sustaining high thermal loads because the wing leading edge is composed of a super alloy skin that is heat resistant and is easily pre-assembled and installed to the wing box spar with strategically located internal attached fittings which allow thermal and aerodynamic growth to prevent permanent deformation of the module. The individual modules, when installed edge to edge and adjacent to each other, are allowed to expand and slide across an externally mounted T-seal that covers the edge gap between modules. The super alloy can be a combination of metals, such as, but not limited to, INCONEL®, which is a trademark of Special Metals Corporation of New York.

The illustrative embodiments also recognize and take into account that no known solution exists for reentry vehicles composed of a metallic leading edge. The reason is that metallic leading edges generally have not been able to withstand the high temperature loads experienced by spacecraft upon reentry into the Earth's atmosphere. Nevertheless, the illustrative embodiments recognize and take into account that a metallic leading edge is desired as it is more durable than existing leading edge designs, such as that on the space shuttle. The current space shuttles use ceramic tiles for the leading edge and required a much more complex structure to prevent the ceramic tiles from breaking.

The illustrative embodiments recognize and take into account that reusable spacecraft for low earth orbit are becoming increasingly desirable. The illustrative embodiments recognize and take into account that reentry from low Earth orbit generates lower thermal loads during reentry than reentry from higher orbits. A lower thermal load is still considered a high thermal load, but is typically less than the 6000° experienced by the space shuttle during reentry from a high orbit. Thus, the illustrative embodiments recognized and take into account that a metallic leading edge is sufficient for certain low orbit applications, such as, for example, the XS-1 low Earth orbit reusable spacecraft.

Thus, the illustrative embodiments provide for a metallic wing leading edge for high temperature space vehicle applications. The leading edge includes modular metallic panel assemblies disposed along the wing leading edge spar, with each modular metallic panel assembly composed of four attach points: two upper and two lower attach points, wherein at least one upper and one lower attach point enables motion along the longitudinal length of the spar. A seal is positioned between each modular metallic panel assembly. The spar of the metallic leading edge is composed of a notch positioned between each modular metallic attach point between each modular metallic panel assembly. The notch enables assembly access for attaching each of the modular metallic panel assemblies. Removable ceramic tiles are disposed along the length of the front spar, adjacent to the upper and lower ends of the modular metallic attach points, and comprises a surface for providing a continuous surface between the tile, modular metallic panel and the outer wing surface. Other variations are possible. Thus, reference is now made to the figures and other examples provided herein.

Figure 1:
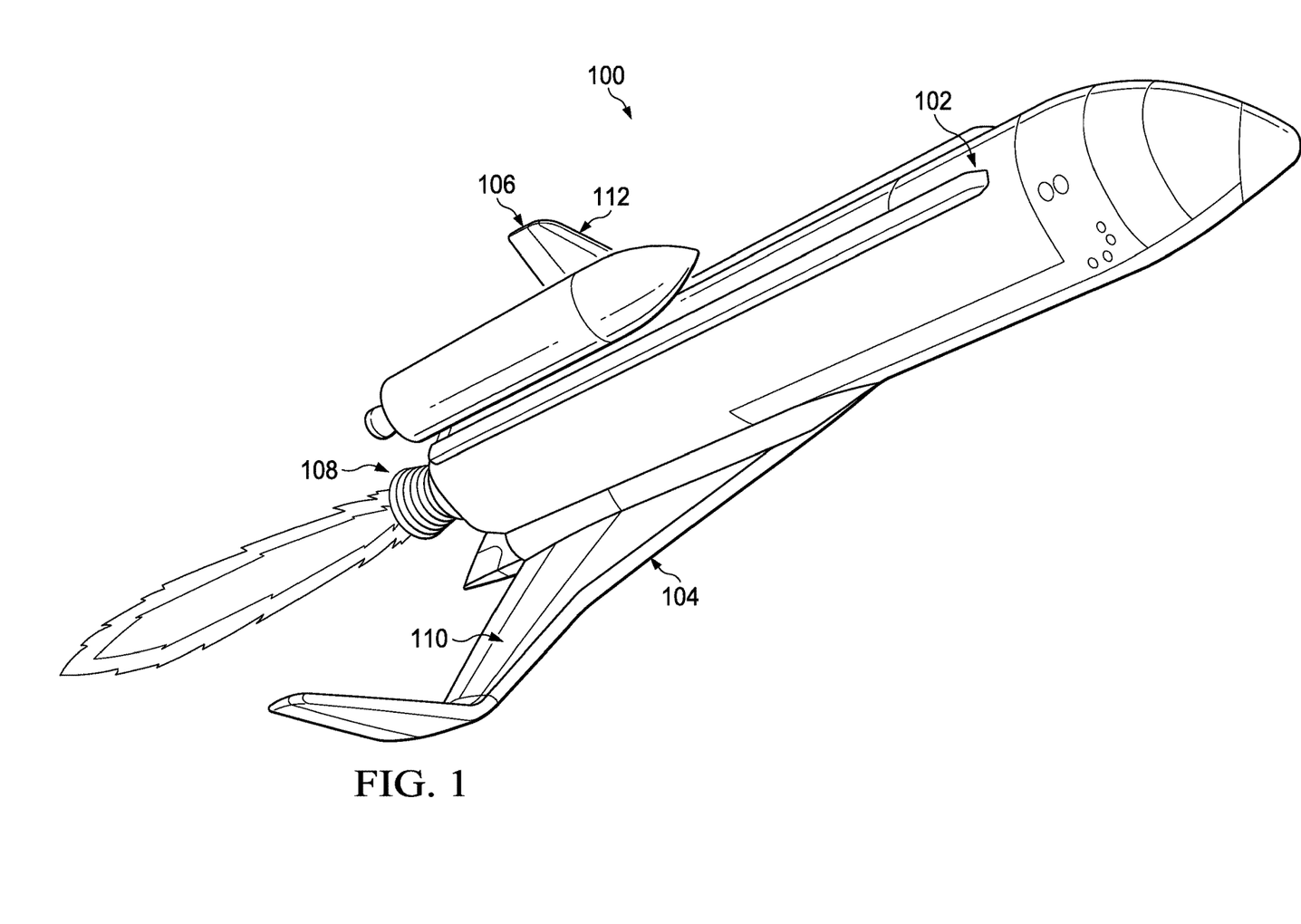
FIG. 1 illustrates a reusable spacecraft, in accordance with an illustrative embodiment.

FIG. 1 illustrates a reusable spacecraft, in accordance with an illustrative embodiment. Spacecraft 100 is an example of a spacecraft which may have installed on it a wing leading edge according to the illustrative embodiments. Spacecraft 100 may be, for example, the XS-1 reusable space vehicle produced by the Boeing Company. However, the illustrative embodiments are not limited to the XS-1 reusable space vehicle, but are applicable to many different types of spacecraft or other vehicles.

Spacecraft 100 includes fuselage 102, wing 104, wing 106, and engine 108. Wing 104 and wing 106 include leading edge 110 and leading edge 112, the design of which is the subject of FIG. 2 through FIG. 11, below.

Figure 2:
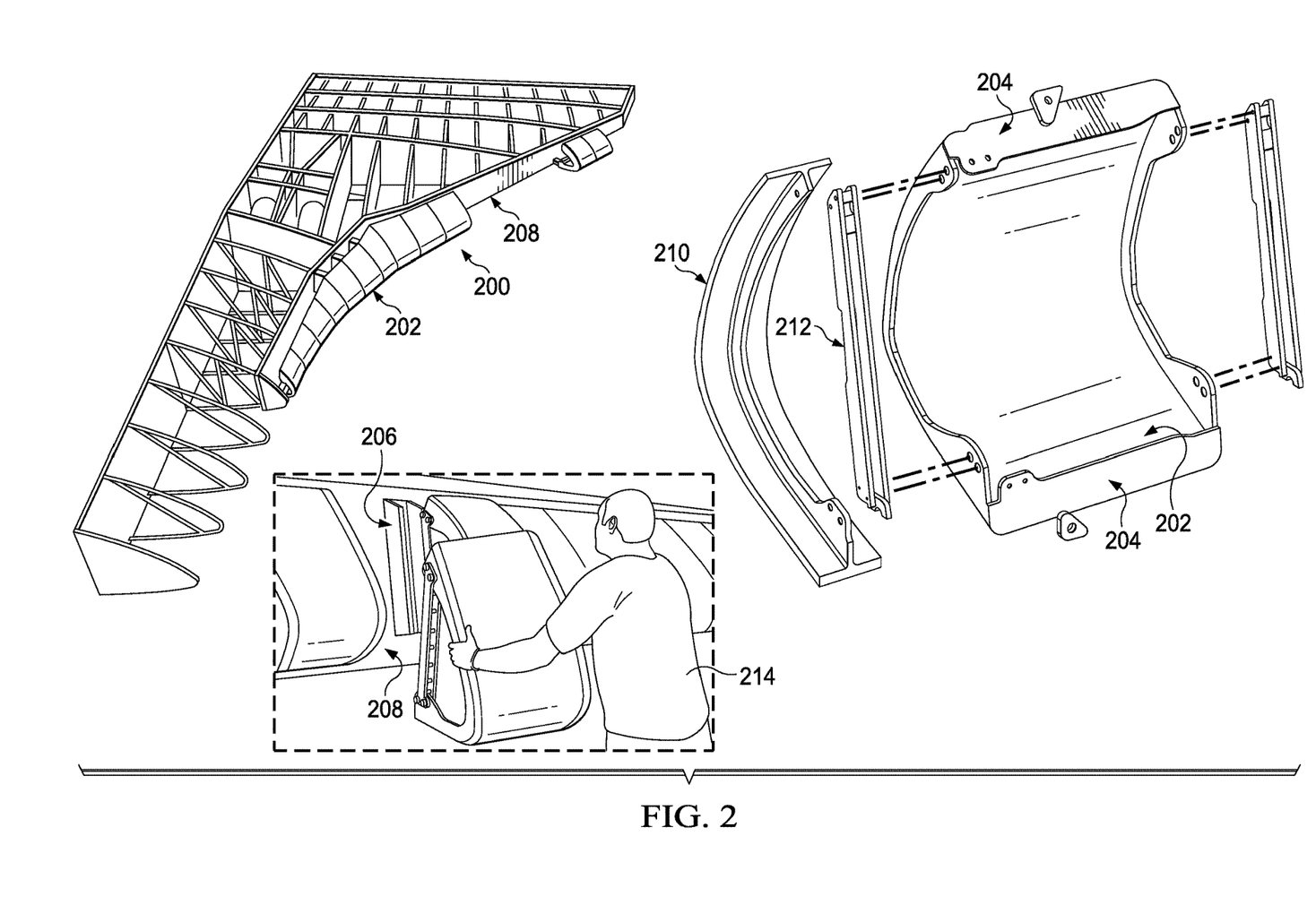
FIG. 2 illustrates a prior art wing leading edge heat protection system for the space shuttle, in accordance with an illustrative embodiment.

FIG. 2 illustrates a prior art wing leading edge heat protection system for the space shuttle, in accordance with an illustrative embodiment. Wing leading edge 200 is used in actual space shuttles used by the National Aeronautics and Space Administration (NASA).

Wing leading edge 200 includes curved skin panels, such as skin panel 202. Flanges 204 on skin panel 202 attach to brace 206, which in turn is mounted to spar 208. T-seal 210 with cross-brace 212 is connected between individual skin panels.

Skin panel 202 is detachable by engineer 214. However, reaching the bolts for securing skin panel 202 to spar 208 can be difficult because the bolts have to be hidden by the thermal protection system in order to be protected from the extreme heat during reentry into Earth's atmosphere.

Figure 3:
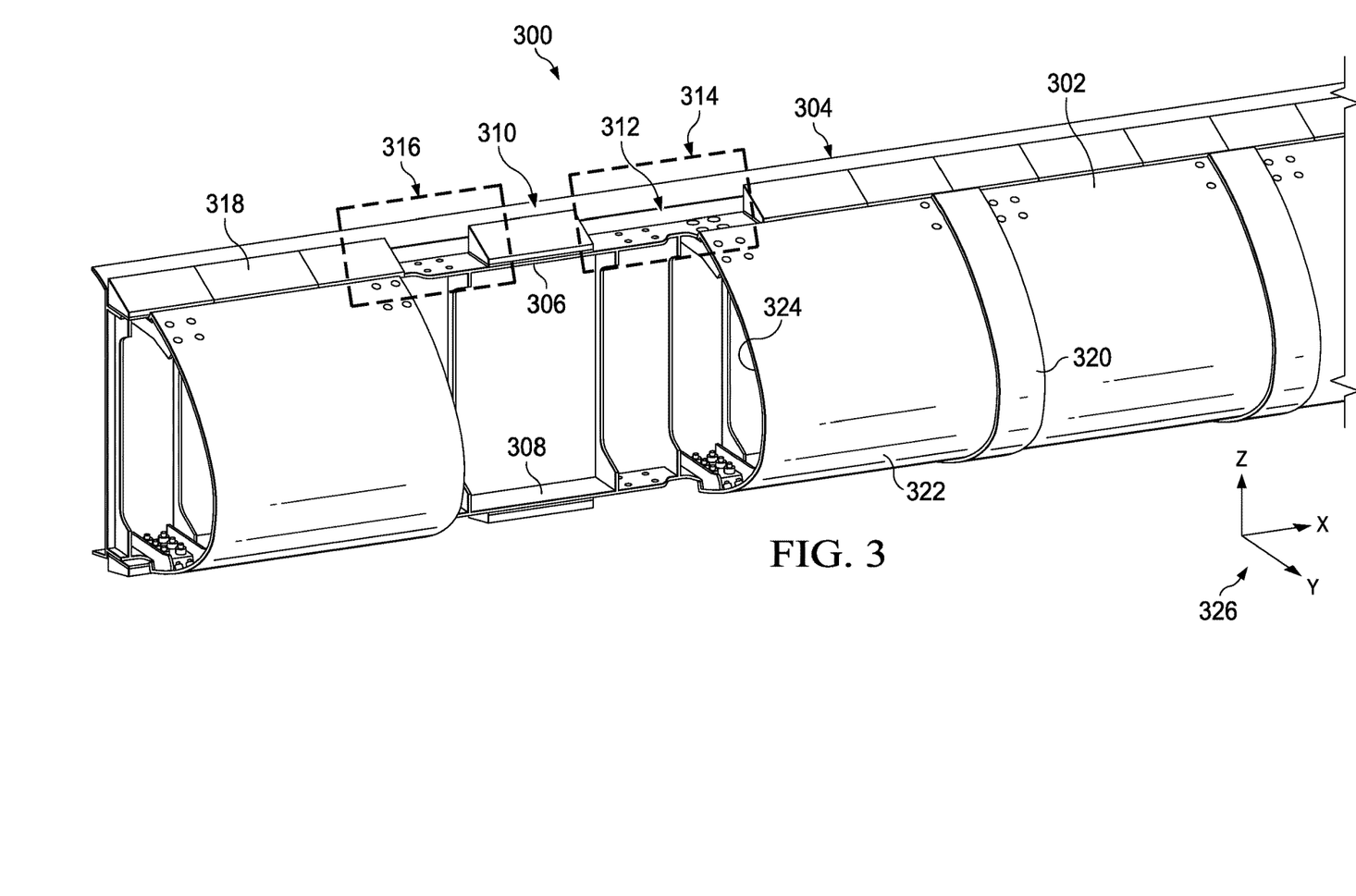
FIG. 3 illustrates an overview of a wing leading edge thermal protection system, in accordance with an illustrative embodiment.

FIG. 3 illustrates an overview of a wing leading edge thermal protection system, in accordance with an illustrative embodiment. Wing leading edge 300 has several advantages over the prior art wing leading edge 200 shown in FIG. 2.

Wing leading edge 300 includes a plurality of skin panels, such as skin panel 302, attached to spar 304. Spar 304 includes a pair of opposing flanges jutting from a vertical edge of spar 304, including flange 306 and flange 308. Flange 306 and flange 308 are disposed a distance away from edge 310 of spar 304 in order to create insets, such as inset 312. These insets are shown at area 314 and area 316 where heat resistant tiles, such as tile 318, have been removed in order to show inset 312. Skin panel 322 is adjacent skin panel 302. Skin panel 322 includes leading edge 324.

Figure 4:
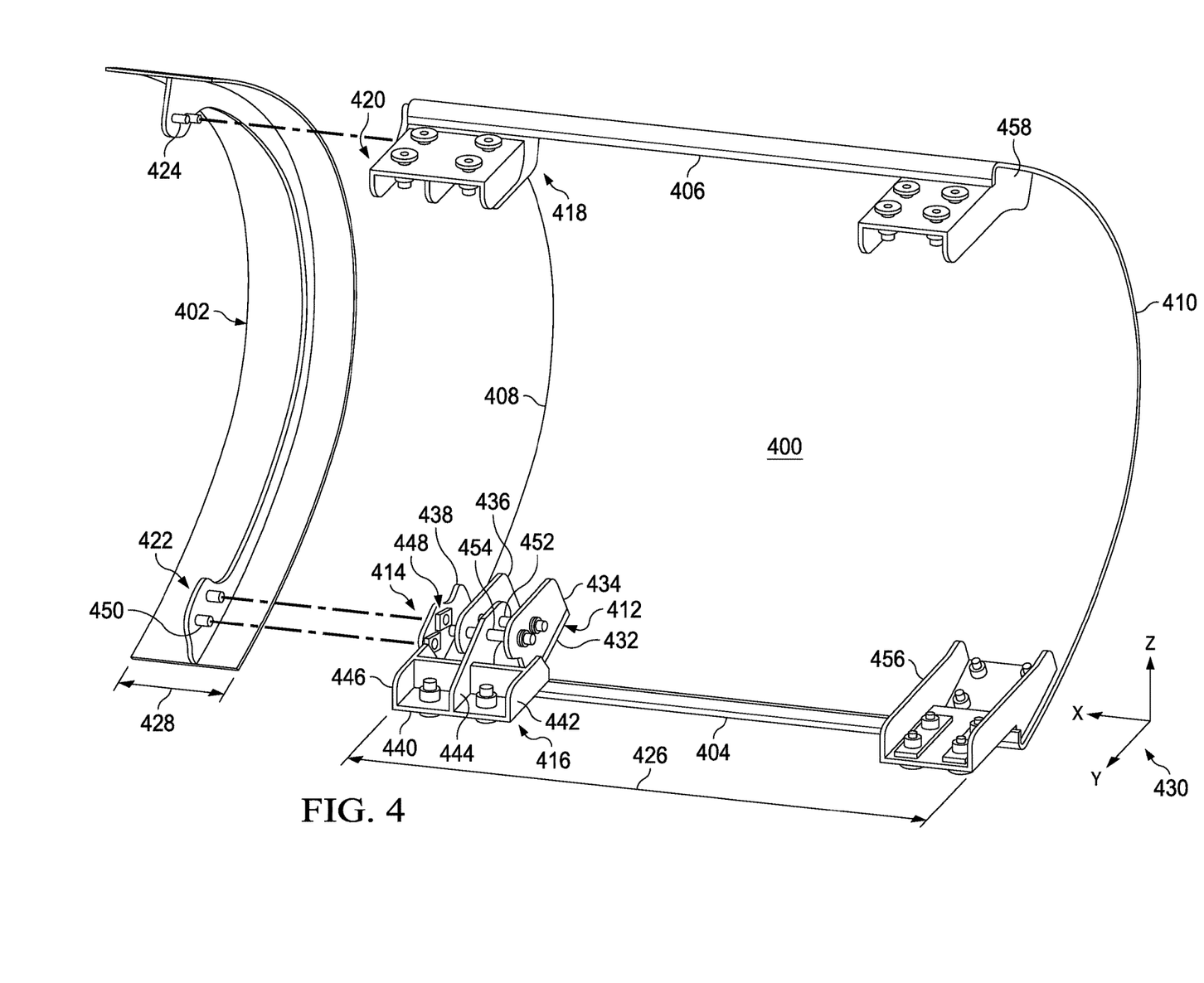
FIG. 4 illustrates a panel and a T-seal of the wing leading edge shown in FIG. 3, in accordance with an illustrative embodiment.

Wing leading edge 300 is connected to spar 304 by connections to flange 306 and flange 308, as shown with respect to FIG. 4. Between each wing leading edge is a T-seal, such as T-seal 320. T-seal 320 is indirectly connected to either or both of the adjoining wing leading edges, as shown with respect to FIG. 4. The term "indirectly connected" is used because T-seal 320 connects to connectors or sliding attached fittings that are directly connected to adjoining wing leading edges.

This arrangement has a variety of advantages over the known art. For example, the placement and shape of the tiles, generally triangular, allow the tiles to be easily removed from the insets in order to grant technicians easy access to the bolts which secure a wing leading edge to a flange. Thus, the illustrative embodiments are much easier for a technician to access and replace after a spacecraft has been used and is being serviced for reuse.

Wing leading edge 300 and the other wing leading edges can be formed from a variety of different materials. In one illustrative embodiment, wing leading edge 302 and T-seal 320 can be fashioned from INCOLOY 909®, INCOLOY 625®, or some other metallic alloy having a high heat resistance. The tiles, such as tile 318, can be formed from a variety heat resistant materials, such as the carbon-based tiles used on the space shuttle. Spar 304 can be formed from aluminum to save weight. However, these materials can be varied and thus do not necessarily limit the illustrative embodiments.

FIG. 4 illustrates a panel and a T-seal of the wing leading edge shown in FIG. 3, in accordance with an illustrative embodiment. Curved section 400 may be wing leading edge 300 of FIG. 3. T-seal 402 may be T-seal 320 of FIG. 3. The connectors shown in FIG. 4 are also shown in FIG. 3, though FIG. 4 shows a better angle to view the connectors, and thus are described here with respect to FIG. 4.

Curved section 400 may be described as a curved section of material ending in first terminal edge 404 that generally opposes second terminal edge 406. The shape of the curved section may be described as "bullnose", though a variety of arcuate shapes are possible. The curved section further includes first longitudinal edge 408 that generally opposes second longitudinal edge 410.

First connector 412 is fixedly attached to curved section 400 and terminates at about first terminal edge 404. First connector 412 further includes first side connector 414 facing first longitudinal edge 408.

Second connector 416 is connected to first connector 412 and extends past first terminal edge 404. Second connector 416 may also be slideably connected to first connector 412, as described further below.

The wing leading edge also includes third connector 418 fixedly attached to curved section 400 and terminating at about second terminal edge 406. Third connector 418 further includes a second side connector (not shown) facing first longitudinal edge 408. The wing leading edge also includes fourth connector 420 slideably connected to third connector 418 and extending past second terminal edge 406.

The wing leading edge may also include T-seal 402, which is composed of a second curved section having a first curvature about matching a second curvature of curved section 400. T-seal 402 is indirectly connected to curved section 400, as described below. The term "indirectly connected" is used, because T-seal 402 is connected to second connector 416 and fourth connector 420 (both of which may be characterized as sliding attached fittings), which in turn are directly connected to curved section 400.

For example, T-seal 402 may include third side connector 422 configured to interface with first side connector 414; and fourth side connector 424 configured to interface with the second side connector 416. In this case, T-seal 402 is attached to the curved edge of first longitudinal edge 408 by third side connector 422 being connected to first side connector 412, and fourth side connector 424 being connected to the second side connector.

In an illustrative embodiment, first latitudinal width 426 of curved section 400 is greater than second latitudinal width 428 of T-seal 402. The term "latitudinal" refers to the X-direction of axis 430.

In an illustrative embodiment, the wing leading edge is attached to a spar, such as spar 304 of FIG. 3, which has a spar width along the Z direction greater than first longitudinal width 426 of curved section 400. In this case, the first terminal edge 404 and second terminal edge 406 are connected to the spar.

Furthermore, the spar may have a first end along a length of the spar generally opposing a second end along the length of the spar. These ends generally can be seen in FIG. 3 at the top and bottom of the spar. In this case, a first flange, such as flange 308, projects from the first end, and second connector 416 is connected to the first flange (flange 306 of FIG. 3). In addition, the spar may have a second flange, such as flange 306, projecting from the second end. In this case, fourth connector 420 is connected to the second flange (flange 308 in FIG. 3).

In an illustrative embodiment, the first flange forms a first inset sunk into the first end and the second flange forms a second inset (inset 312 in FIG. 3) sunk into the second end. In this case, the wing leading edge further includes first thermal protection tile, not shown, disposed in the first inset, not shown, and second thermal protection, such as tile 318, tile disposed in the second inset (inset 312 in FIG. 3).

In another illustrative embodiment, first connector 412 includes first plate 432 that is flush with curved section 400, second plate 434 that extends about orthogonal to first plate 432, third plate 436 that extends about orthogonal to first plate 432, and fourth plate 438 that extends about orthogonal to first plate 432. In this case, and first plate 432 is bolted to curved section 400.

In another illustrative embodiment, second connector 416 includes fifth plate 440 that is flush with the flange (such as flange 308 in FIG. 3), sixth plate 442 that extends about orthogonal to fifth plate 440, seventh plate 444 that extends about orthogonal to fifth plate 440, and eighth plate 446 that extends about orthogonal to fifth plate 440. In this case, fifth plate 440 is bolted to the flange (such as flange 308 in FIG. 3).

In an illustrative embodiment, first side connector 414 includes pair of bolt holes 448 in fourth plate 438. In this case, third side connector 422 of T-seal 402 comprises pair of bolts 450. However, other connection schemes are possible, such as more or fewer bolts, the addition of nuts or screw threading to the bolts, or any other suitable connection mechanism.

In another illustrative embodiment, sixth plate 442 and eighth plate 446 terminate at about first terminal edge 404. In this case, seventh plate 444 extends past first terminal edge 404 between second plate 434 and third plate 436. In this manner, first connector 412 can be attached to second connector 416.

In still another illustrative embodiment, first bolt 452 extends from second plate 434, through seventh plate 444, and through third plate 436. When only one bolt connects first connector 412 to second connector 416, rotation can be allowed between these two connectors, particularly in order to accommodate deformation of the wing leading edge during high temperature loads in some illustrative embodiments. However, in other illustrative embodiments, such as shown in FIG. 4, second bolt 454 may be present and extending generally parallel to the first bolt. The presence of second bolt 454 may prevent rotation, but still allow sliding of second connector 416 relative to first connector 412 along the X direction of axis 430, as explained further blow.

Thus, in an illustrative embodiment, second connector 416 can be, and preferably is, slideable with respect to first connector 412. Second connector 416 is slideable in a direction along a first latitudinal width 426 of curved section 400, such as X direction on axis 430. This arrangement allows first connector 412 to slide along one or both of first bolt 452 and second bolt 454 when curved section 400 of the leading edge expands as a result of increased temperatures. Note that second connector 416 remains fixed relative to the spar, and thus remains fixed relative to the spacecraft when curved panel 400 thermally expands.

A similar arrangement of components, as described with respect to first connector 412 and second connector 416, may also be provided with respect to third connector 418 and fourth connector 420. In another illustrative embodiment, one bolt can connect the two connectors at one leading edge, but two bolts can connect the other two connectors at the other leading edge. In this manner, curved section 400 can slide in the X direction of axis 430 to accommodate thermal expansion of curved section 400.

Additional detail is now provided regarding the slidability of one longitudinal edge of curved panel 400 as a result of thermal expansion of curved panel 400. T-seal 402 slides horizontally along the "X" direction shown on axis 430 along with the thermal expansion of curved section 400. In other words, because first connector 412 and third connector 418 are fixed to curved panel 400), these connectors do not move relative to curved section 400; however, because second connector 416 and fourth connector 420 are slidably connected to first connector 412 and third connector 418, respectively, curved panel 400 together with T-seal 402 are allowed to slide in the "X" direction on axis 430 as curved panel 400 thermally expands. In other words, because T-seal 402 is connected to second connector 412 and fourth connector 418, T-seal 402 moves with this thermal expansion.

Referring back to FIG. 3, this thermal expansion pushes, for example, skin panel 322 with T-seal 320 towards the adjacent skin panel 302. Note that there is a gap between skin panel 302 and skin panel 322 to accommodate this expansion. However, T-seal 320 entirely covers the longitudinal edges of both skin panel 302 and skin panel 322 so that hot gasses are prevented from coming into contact with spar 304.

Note also that skin panel 322 of is viewed from the opposite side relative to curved section 400 of FIG. 4. Thus, the "X" direction of axis 336 of FIG. 3 is flipped with respect to the "X" direction of axis 430 of FIG. 4. Accordingly, movement of a skin panel or wing leading edge caused by thermal expansion is actually occurring in the same direction with respect to both figures, even though the axis appears flipped between the two figures. Preferably, each panel is configured similarly such that thermal expansion generally takes place in the direction from the left side towards the right side of FIG. 3; however, this direction corresponds to right to left in FIG. 4 since the structures are viewed from the opposite side. In other illustrative embodiments, this thermal expansion can be constrained to take place in the opposing direction, or different panels can be arranged so that panels may expand towards each other. Accordingly, the example shown in FIG. 3 and FIG. 4 does not necessarily limit the claimed inventions herein.

Returning again to FIG. 4, in an illustrative embodiment, on the other side of curved section 400, at second longitudinal edge 410, fifth connector 456 is fixedly and directly attached to curved panel 400. Likewise, and sixth connector 458 is also fixedly and directly attached to curved panel 400. Both fifth connector 456 and sixth connector 458 are also fixedly and directly attached to the spar (shown in FIG. 3 as spar 304). For this reason, longitudinal edge 410 substantially does not move with respect to the spar when curved panel 400 expands under a thermal load. Instead, expansion takes place in the "X" direction shown on axis 430, as described above. Accordingly, in one illustrative embodiment, curved panel may be fixedly attached to the spar on one longitudinal edge, but slidably attached to the spar on the opposing longitudinal edge. This arrangement is one of the preferred illustrative embodiments.

Referring again back to FIG. 3 and also to FIG. 4 together, all of the skin panels shown will undergo thermal expansion during a high thermal load. Thermal expansion of a skin panel may be 0.25 inches, perhaps more, along the "X" direction of axis 326. When this expansion occurs, skin panel 322 will expand in the direction of skin panel 302. However, leading edge 324 of skin panel 322 (and the leading edge of skin panel 302 immediately adjacent skin panel 322) does not move because it is fixedly attached to spar 304.

In summary, any given skin panel of the wing leading edge of the illustrative embodiments preferably is fixedly attached to a spar at one leading edge but slidably attached to the spar at the opposing leading edge. Each T-seal is connected to the leading edge that is allowed to slide, but not directly to the spar, though the T-seal covers any gaps between skin panels (or curved panels) so that hot gasses are not permitted to come into direct contact with the spar or other structural components of the space vehicle.

Nevertheless, additional variations are possible. For example, a skin panel may be allowed to slide at both longitudinal edges by providing an arrangement of four connectors at the opposing edge as for the slidable edge as described with respect to FIG. 4. If rotation of a skin panel is a concern under a thermal load, then only one bar or bolt may connect the slidable connector to the connector attached to the spar in order to allow skin curved panel 400 to rotate relative to the spar. Still other variations are possible. Thus, the illustrative embodiments described with respect to FIG. 4 do not necessarily limit the claimed inventions of the other illustrative embodiments described herein.

Figure 5:
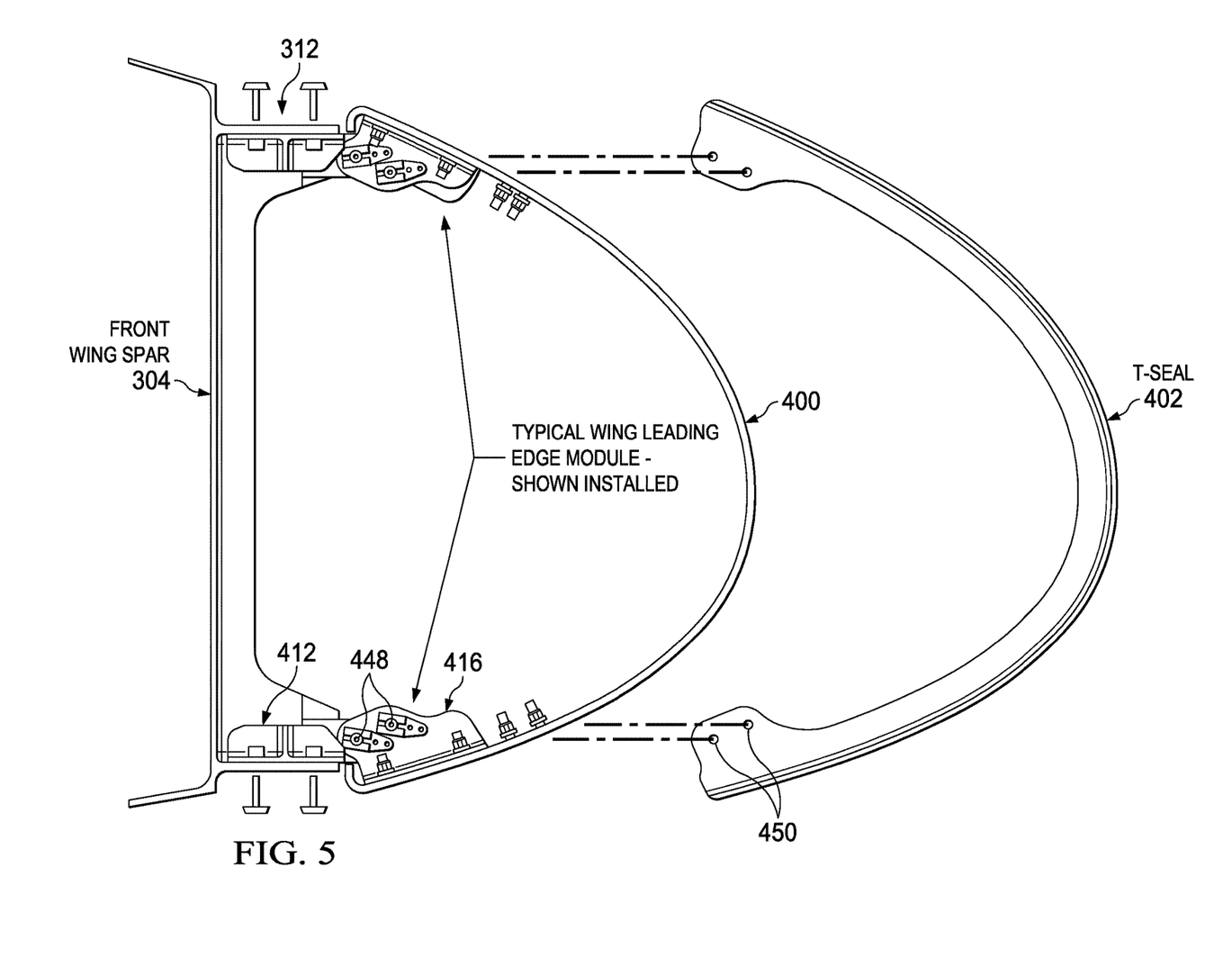
FIG. 5 illustrates the connection of a T-seal to the outer most flange of an upper and lower sliding attached fitting of a reusable spacecraft, in accordance with an illustrative embodiment.
Figure 6:
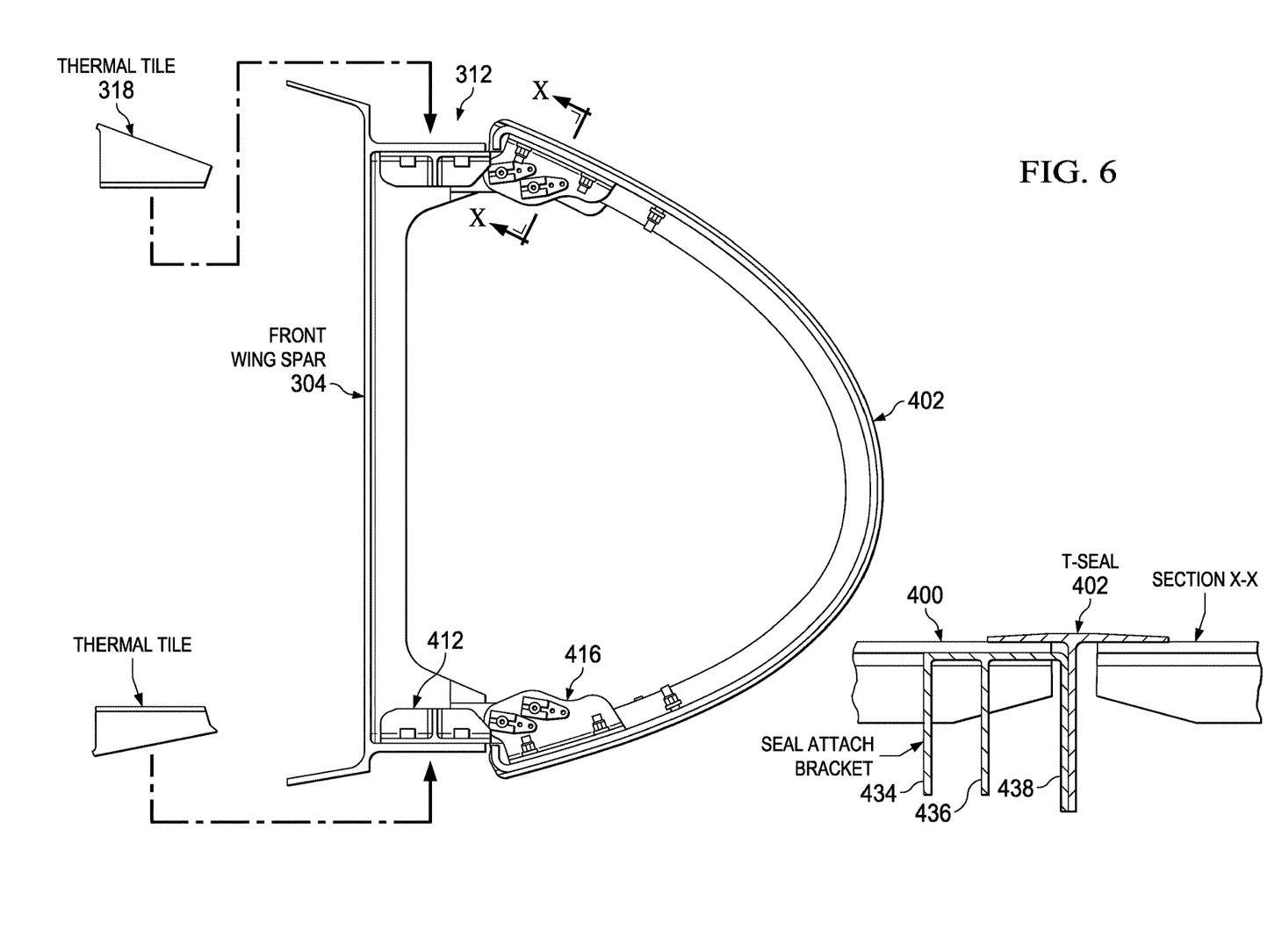
FIG. 6 illustrates the connection of a T-seal to the outer most flange of an upper and lower sliding attached fitting of a reusable spacecraft, in accordance with an illustrative embodiment.

FIG. 5 illustrates connection of a T-seal to the outer most flange of an upper and lower sliding attach fitting of a reusable spacecraft, in accordance with an illustrative embodiment. FIG. 6 illustrates connection of a T-seal to the outer most flange of an upper and lower sliding attach fitting of a reusable spacecraft, in accordance with an illustrative embodiment. The lower sliding attach fitting may be second connector 416 in FIG. 4. The upper sliding attach fitting may be fourth connector 420 in FIG. 4.

FIG. 5 and FIG. 6 should be considered together. The various components shown with respect to FIG. 5 and FIG. 6 have already been described with respect to FIG. 3 and FIG. 4. However, here a different perspective shows another view of how the components fit together. Selected ones of the reference numerals from FIG. 3 and FIG. 4 are shown in FIG. 5 and Figure for reference. Corresponding reference numerals in FIG. 5 and FIG. 6 have corresponding descriptions in FIG. 3 and FIG. 4.

Figure 7:
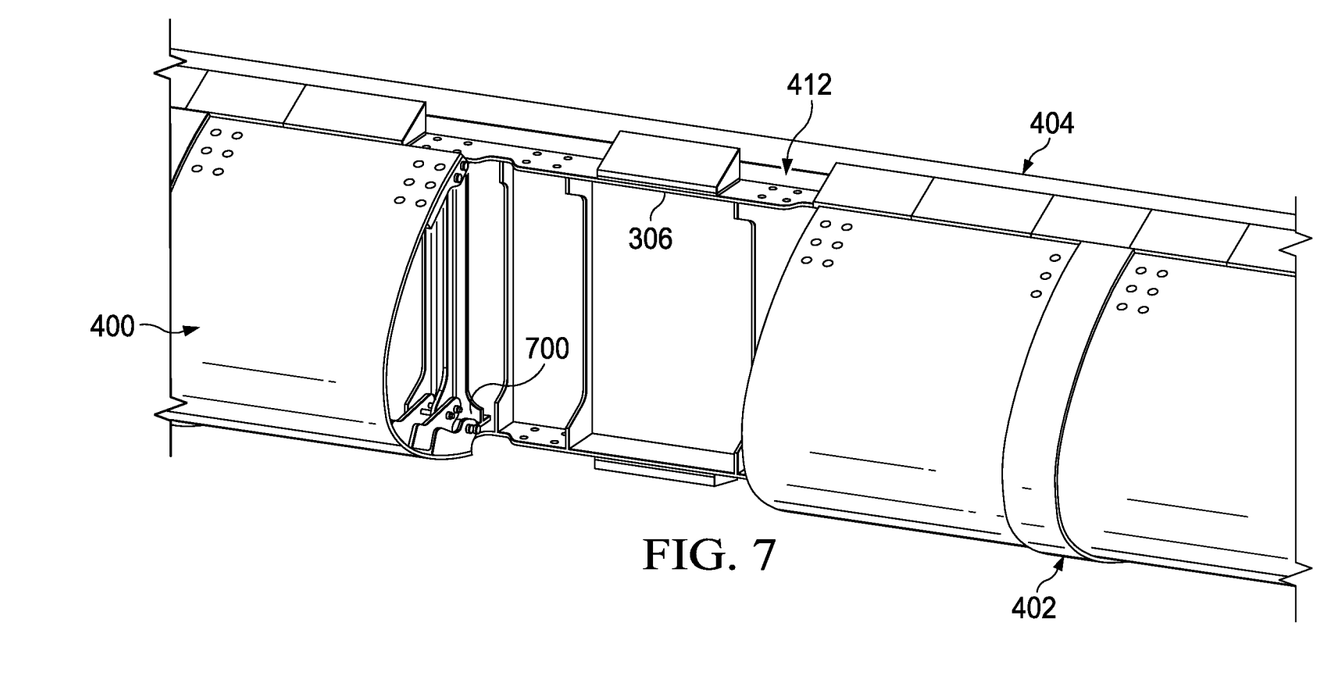
FIG. 7 illustrates an overview of an alternative wing leading edge thermal protection system, in accordance with an illustrative embodiment.
Figure 8:
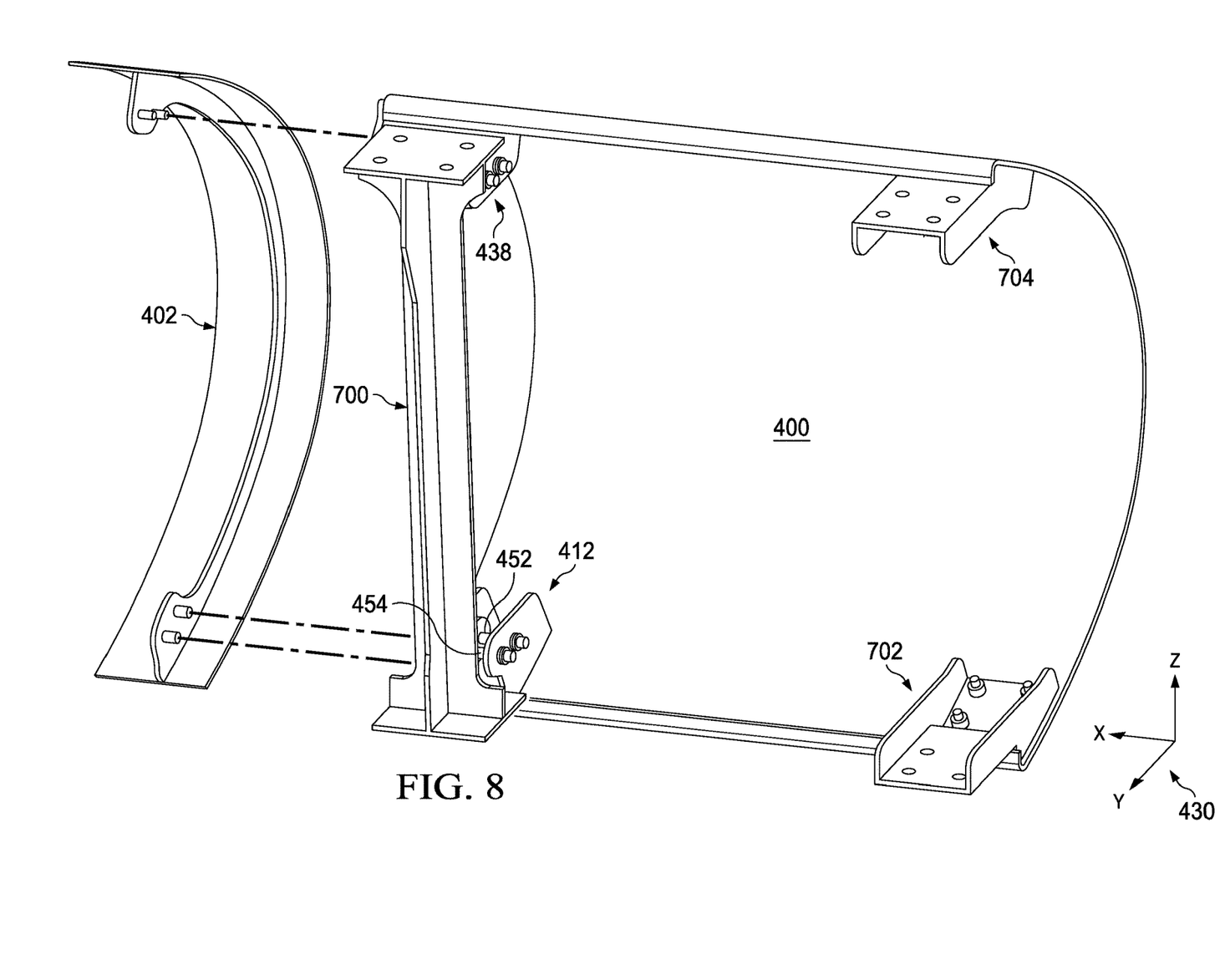
FIG. 8 illustrates a panel and a T-seal of the alternative wing leading edge thermal protection system shown in FIG. 7, in accordance with an illustrative embodiment.

FIG. 7 illustrates an overview of an alternative wing leading edge thermal protection system, in accordance with an illustrative embodiment. FIG. 8 illustrates a panel and a T-seal of the alternative wing leading edge thermal protection system shown in FIG. 7, in accordance with an illustrative embodiment. FIG. 7 and FIG. 8 should be viewed together in the same manner that FIG. 3 and FIG. 4 are viewed together.

Generally, the arrangement of features in FIG. 7 and FIG. 8 are the same as the arrangement of features shown in FIG. 3 and FIG. 4. Thus, except where noted below, the arrangement and nomenclature of components in FIG. 7 and FIG. 8 is the same as those provided in FIG. 3 and FIG. 4. For example, T-seal 402 is still placed between panels, such as curved section 400.

FIG. 7 and FIG. 8 do not contain all the reference numerals shown in FIG. 3 and FIG. 4 for all features that are in common between FIG. 7 and FIG. 8 relative to FIG. 3 and FIG. 4. The reason for this omission is to emphasize and more clearly single out the differences between these sets of figures. These differences are described in the following four paragraphs. However, where similar structures are shown in FIG. 7 and FIG. 8 relative to FIG. 3 and FIG. 4, it should be assumed that these structures have similar descriptions and purposes as described above. Attention is now turned to the alternative embodiments shown in FIG. 7 and FIG. 8.

The primary difference between FIG. 3 and FIG. 4 versus FIG. 7 and FIG. 8 is that, while first connector 412 is retained, second connector 416 is not present. First connector is lengthened to accommodate six bolts in curved section 400, instead of two or four bolts. However, in either set of figures, more or fewer bolts may be present to affix first connector 412 to curved section 400.

Another difference is that cross beam 700 is present, connecting first connector 412 to third connector 418, shown in FIG. 4. In turn, cross beam 700 is connected to the insets, such as inset 312 in spar 304 shown in FIG. 3. Note that cross beam 700 may still be made slide-able in the X direction along axis 430, by being connected only by first bolt 452 and/or second bolt 454, as described with respect to FIG. 4. Cross beam 700 is similarly connected to third connector 418 of FIG. 4. In an illustrative embodiment, cross beam 700 may be fashioned from titanium, but may be formed from other metals or substances, or from alloys such as INCONEL 909® or INCONEL 625®.

Still another difference, either in addition to or in place of cross beam 700, are fixed connector 702 and fixed connector 704 shown in FIG. 8. These fixed connectors can accommodate a cross beam, such as cross beam 700, or may be directly connected to a flange, such as flange 306 shown in FIG. 3 and in FIG. 7. A fixed connector does not allow translation or movement along the X direction of axis 430, but may prevent such translation, where desirable, in the overall design of the spacecraft.

The illustrative embodiments described with respect to FIG. 3 through FIG. 8 may be further varied. For example, more or fewer connectors may be present along the X direction of axis 430, or even more or fewer connectors along the curves surface of curved section 400 may be present. The materials disclosed for the various components may also be varied. More or fewer plates may be present on the connectors, and the shape and arrangement of the plates may be varied. Thus, the claimed inventions and the illustrative embodiments are not necessarily limited by the examples provided with respect to FIG. 3 through FIG. 8.

Figure 9:
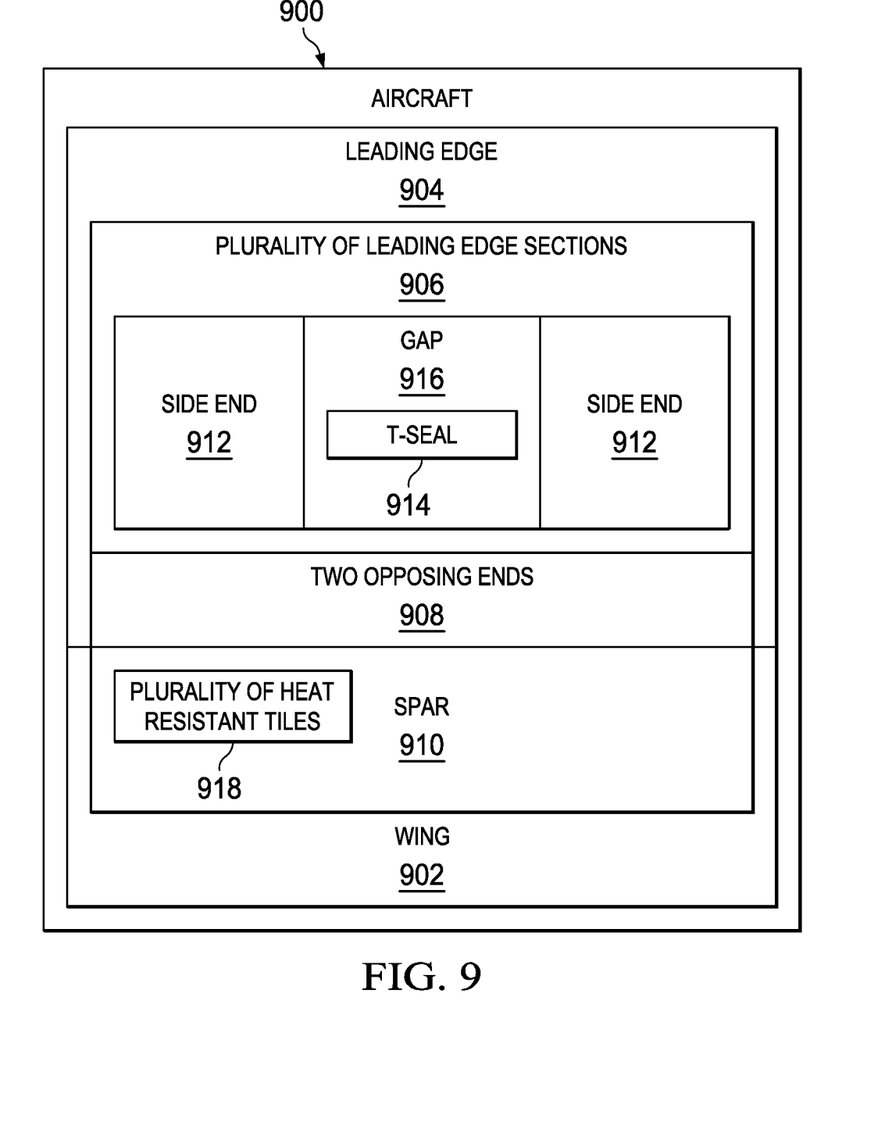
FIG. 9 is a block diagram of a leading edge of a wing for an aircraft that is subject to a wide temperature range, in accordance with an illustrative embodiment.

FIG. 9 is a block diagram of a leading edge of a wing for an aircraft that is subject to a wide temperature range, in accordance with an illustrative embodiment. Aircraft 900 may be spacecraft 100 of FIG. 1. Aircraft 900 includes wing 902 and leading edge 904 of wing 902.

Leading edge 904 includes plurality of leading edge sections 906 arranged along wing 902 so as to define its leading edge. Two opposing ends 908 of each section are removably mounted to spar 910 of wing 902. Side ends 912 of each section are slideably mounted to T-seal 914 so as to allow unimpeded expansion of each leading edge section into gap 916 defined between adjacent leading edge sections.

Aircraft 900 may be varied. For example, T-seal 914 may be arranged to cover each gap 916. In addition, each leading edge may be slideably connected to spar 910.

In another illustrative embodiment, plurality of heat resistant tiles 918 may be disposed on spar 910 where plurality of leading edge sections 906 are connected to spar 910.

Other variations are possible, as described above with respect to FIG. 3 through FIG. 8. Thus, the illustrative embodiments described with respect to FIG. 9 do not necessarily limit the claimed inventions or other illustrative embodiments described herein.

Figure 10:
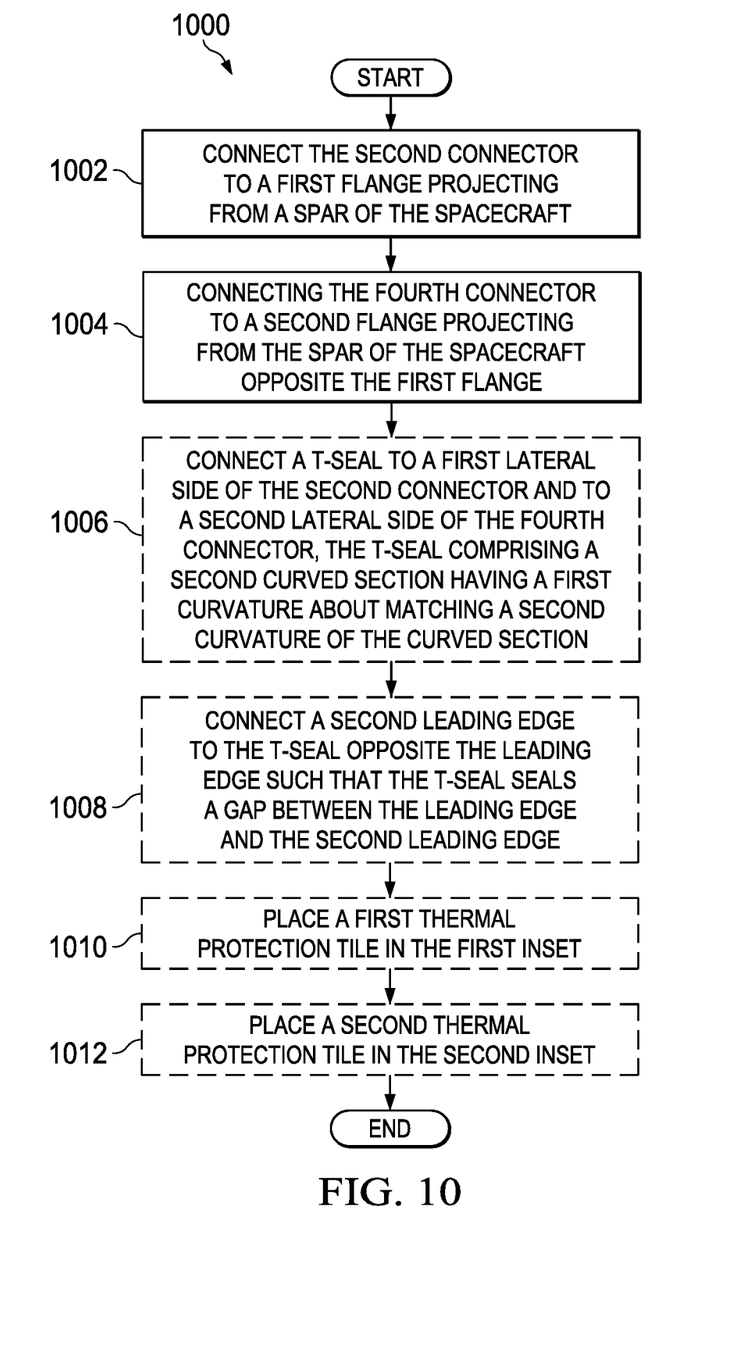
FIG. 10 is a method of manufacturing or maintaining a leading edge of a spacecraft, in accordance with an illustrative embodiment.

FIG. 10 is a method of manufacturing or maintaining a leading edge of a spacecraft, in accordance with an illustrative embodiment. Method 1000 may be used to manufacture, in part, a spacecraft, such as spacecraft 100 of FIG. 1 or spacecraft or aircraft 1200 of FIG. 12. Method 1000 may be used to manufacture a wing leading edge or a curved section, such as described with respect to FIG. 3 through FIG. 9.

Thus, method 1000 may be characterized as a method of manufacturing or maintaining a leading edge of a spacecraft, the leading edge comprising: a curved section of material ending in a first terminal edge that generally opposes a second terminal edge, the curved section further including a first longitudinal edge that generally opposes a second longitudinal edge; a first connector fixedly attached to the curved section and terminating at about the first terminal edge, the first connector further including a first side connector facing the first longitudinal edge; a second connector connected to the first connector and extending past the first terminal edge; a third connector fixedly attached to the curved section and terminating at about the second terminal edge, the third connector further including a second side connector facing the first longitudinal edge; and a fourth connector connected to the third connector and extending past the second terminal edge. The following operations may accomplish the method of making these devices.

Thus, method 1000 includes connecting the second connector to a first flange projecting from a spar of the spacecraft (operation 1002). Method 1000 may also include connecting the fourth connector to a second flange projecting from the spar of the spacecraft opposite the first flange (operation 1004). In one illustrative embodiment, though not shown in FIG. 10, the method may terminate thereafter.

Method 1000 may be varied. For example, method 1000 may also include connecting a T-seal to a first lateral side of the second connector and to a second lateral side of the fourth connector, the T-seal comprising a second curved section having a first curvature about matching a second curvature of the curved section (operation 1006). In this case, method 1000 may also include connecting a second leading edge to the T-seal opposite the leading edge such that the T-seal seals a gap between the leading edge and the second leading edge (operation 1008). Again, in one illustrative embodiment, though not shown in FIG. 10, the method may terminate thereafter.

Still other variations are possible. For example, in method 1000, the first flange may form a first inset sunk into a first end of the spar and the second flange forms a second inset sunk into a second end of the spar. In this case, method 1000 may also include placing a first thermal protection tile in the first inset (operation 1010). In this illustrative embodiment, method 1000 may also include placing a second thermal protection tile in the second inset (operation 1012). Again, in one illustrative embodiment, the method may terminate thereafter.

Method 1000 may be varied. For example, more or fewer operations may be present. In a more specific example, operations 1006, 1008, 1010, and 1012 may be considered optional and thus have dashed lines in FIG. 10. In another specific example, more operations may be added to manufacture the additional components described with respect to FIG. 3 through FIG. 9. Accordingly, the illustrative embodiments described with respect to FIG. 10 do not necessarily limit the claimed inventions or the other illustrative embodiments described herein.

Figure 11:
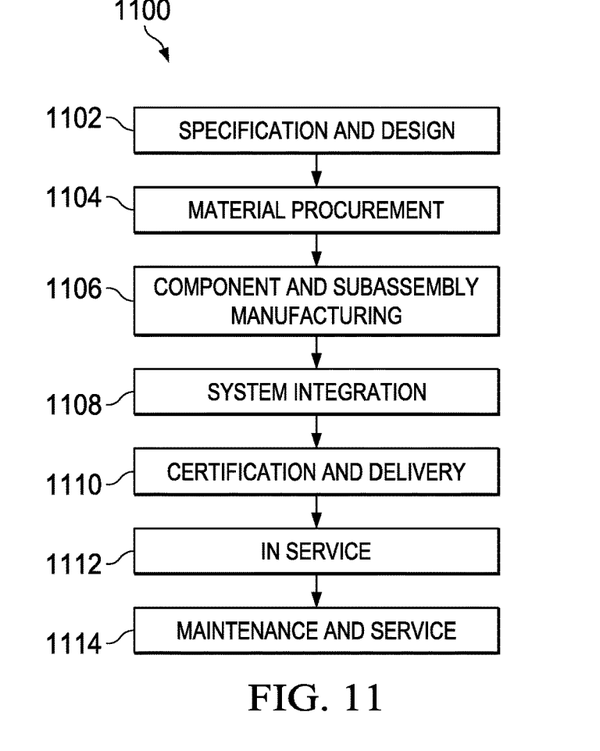
FIG. 11 is illustration of an aircraft manufacturing and service method, in accordance with an illustrative embodiment.
Figure 12:
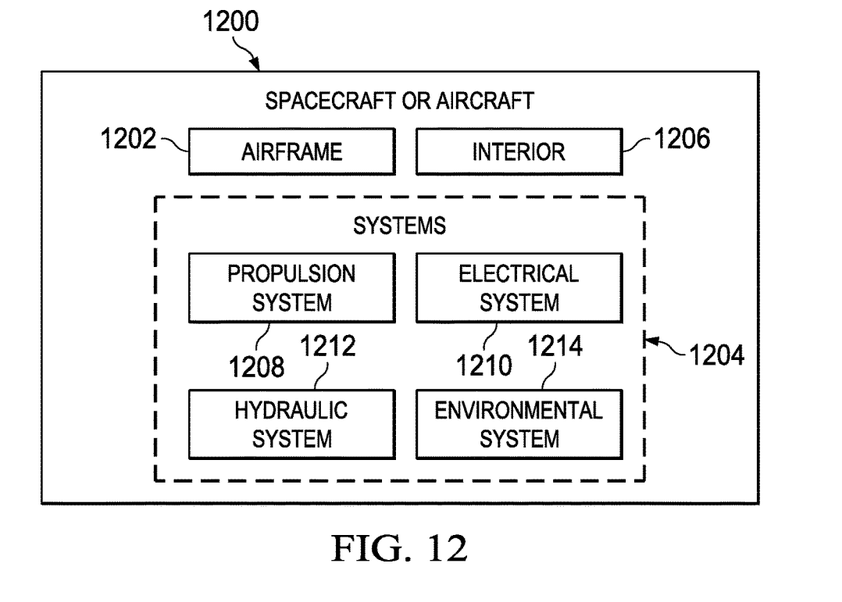
FIG. 12 is an illustration of a spacecraft or aircraft in which an illustrative embodiment may be implemented.

Illustrative embodiments of the disclosure may be described in the context of aircraft manufacturing and service method 1100 as shown in FIG. 11 and spacecraft or aircraft 1200 as shown in FIG. 12, which may be spacecraft 100 of FIG. 1. Turning first to FIG. 11, an illustration of an aircraft manufacturing and service method is depicted in accordance with an illustrative embodiment. During pre-production, aircraft manufacturing and service method 1100 may include specification and design 1102 of spacecraft or aircraft 1200 in FIG. 12 and material procurement 1104.

During production, component and subassembly manufacturing 1106 and system integration 1108 of spacecraft or aircraft 1200 in FIG. 12 takes place. Thereafter, spacecraft or aircraft 1200 in FIG. 12 may go through certification and delivery 1110 in order to be placed in service 1112. While in service 1112 by a customer, spacecraft or aircraft 1200 in FIG. 12 is scheduled for routine maintenance and service 1114, which may include modification, reconfiguration, refurbishment, and other maintenance or service.

Each of the processes of aircraft manufacturing and service method 1100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 12, an illustration of an aircraft is depicted in which an illustrative embodiment may be implemented. In this example, spacecraft or aircraft 1200 is produced by aircraft manufacturing and service method 1100 in FIG. 11 and may include airframe 1202 with plurality of systems 1204 and interior 1206. Examples of systems 1204 include one or more of propulsion system 1208, electrical system 1210, hydraulic system 1212, and environmental system 1214. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1100 in FIG. 11.

In one illustrative example, components or subassemblies produced in component and subassembly manufacturing 1106 in FIG. 11 may be fabricated or manufactured in a manner similar to components or subassemblies produced while spacecraft or aircraft 1200 is in service 1112 in FIG. 11. As yet another example, one or more apparatus embodiments, method embodiments, or a combination thereof may be utilized during production stages, such as component and subassembly manufacturing 1106 and system integration 1108 in FIG. 11. One or more apparatus embodiments, method embodiments, or a combination thereof may be utilized while spacecraft or aircraft 1200 is in service 1112 and/or during maintenance and service 1114 in FIG. 11. The use of a number of the different illustrative embodiments may substantially expedite the assembly of and/or reduce the cost of spacecraft or aircraft 1200.

As used herein, the terms "about", "approximately," or other such relative terms refer to engineering design tolerances known to those of ordinary skill in the art. For example, "about orthogonal" means that one component is orthogonal to another to within a degree that satisfies engineering design tolerances for the particular application at hand.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A leading edge of a wing for an aircraft that is subject to a wide temperature range, such that the leading edge comprises:
    a plurality of leading edge sections arranged along the wing so as to define the leading edge, such that each section of the plurality of leading edge sections respectfully comprises:
        two opposing ends configured to mount removably to a spar of the wing; and
        side ends are slideably mounted to a T-seal, respectively, so as to allow unimpeded expansion of each leading edge section into a gap defined between adjacent leading edge sections, such that the T-seal covers the gap.

2. The leading edge of claim 1 further comprising:
    a plurality of heat resistant tiles disposed on the spar where the plurality of leading edge sections are connected to the spar.

3. A leading edge of a wing of a spacecraft, wherein the leading edge comprises:
    a curved section of material ending in a first terminal edge that generally opposes a second terminal edge, the curved section of material further including a first longitudinal edge that generally opposes a second longitudinal edge;
    a first connector fixedly attached to the curved section of material and terminating at about the first terminal edge, the first connector further including a first side connector facing the first longitudinal edge;

a second connector connected to the first connector and extending past the first terminal edge;

a third connector fixedly attached to the curved section of material and terminating at about the second terminal edge, the third connector further including a second side connector facing the first longitudinal edge; and a fourth connector connected to the third connector and extending past the second terminal edge.

4. The leading edge of claim 3 further comprising:

a T-seal comprising a second curved section having a first curvature about matching a second curvature of the curved section of material, the T-seal indirectly connected to the curved section of material via the second connector and the fourth connector.

5. The leading edge of claim 4, wherein the T-seal further comprises:

a third side connector configured to interface with the first side connector and attach the T-seal to a curved edge via a connection to the first side connector; and a fourth side connector configured to interface with the second side connector and attach the T-seal to the curved edge via a connection to the second side connector.

6. The leading edge of claim 5, wherein a first latitudinal width of the curved section of material is greater than a second latitudinal width of the T-seal.

7. The leading edge of claim 6, wherein the leading edge further comprises:

a spar that has a spar width greater than a first longitudinal width of the curved section of material, and wherein the first terminal edge and the second terminal edge are connected to the spar.

8. The leading edge of claim 7, wherein the spar has a first end along a length of the spar generally opposing a second end along the length of the spar, and wherein the spar further comprises:

a first flange projecting from the first end;
the second connector connected to the first flange;
a second flange projecting from the second end; and
the fourth connector connected to the second flange.

9. The leading edge of claim 8, wherein the first flange forms a first inset sunk into the first end and the second flange forms a second inset sunk into the second end, and wherein the leading edge further comprises:

a first thermal protection tile disposed in the first inset; and a second thermal protection tile disposed in the second inset.

10. The leading edge of claim 8, wherein the first connector comprises a first plate that is flush with the curved section of material, a second plate that extends about orthogonal to the first plate, a third plate that extends about orthogonal to the first plate, and a fourth plate that extends about orthogonal to the first plate, and wherein the first plate is bolted to the curved section of material.

11. The leading edge of claim 10, wherein the second connector comprises a fifth plate that is flush with the first flange, a sixth plate that extends about orthogonal to the fifth plate, a seventh plate that extends about orthogonal to the fifth plate, and an eighth plate that extends about orthogonal to the fifth plate, and wherein the fifth plate is bolted to the first flange.

12. The leading edge of claim 11, wherein the first side connector comprises a pair of bolt holes in the fourth plate, and wherein the third side connector comprises a pair of bolts.

13. The leading edge of claim 12, wherein the sixth plate and the eighth plate terminate at about the first terminal edge, and the seventh plate extends past the first terminal edge between the second plate and the third plate.

14. The leading edge of claim 13, wherein a bolt extends from the second plate, through the seventh plate, and through the third plate.

15. The leading edge of claim 4, further comprising the second connector configured to:

slide with respect to the first connector;
slide in a direction along a length of the curved section of material; and
slide to accommodate an expansion of the leading edge due to an increased temperature of the leading edge.

16. A method of manufacturing or maintaining a leading edge of a spacecraft, the leading edge comprising: a curved section of material ending in a first terminal edge that generally opposes a second terminal edge, the curved section of material further including a first longitudinal edge that generally opposes a second longitudinal edge; a first connector fixedly attached to the curved section of material and terminating at about the first terminal edge, the first connector further including a first side connector facing the first longitudinal edge; a second connector connected to the first connector and extending past the first terminal edge; a third connector fixedly attached to the curved section of material and terminating at about the second terminal edge, the third connector further including a second side connector facing the first longitudinal edge; and a fourth connector connected to the third connector and extending past the second terminal edge, the method comprising:

connecting the second connector to a first flange projecting from a spar of the spacecraft; and connecting the fourth connector to a second flange projecting from the spar of the spacecraft opposite the first flange.

17. The method of claim 16 further comprising:

connecting a T-seal to a first lateral side of the second connector and to a second lateral side of the fourth connector, the T-seal comprising a second curved section having a first curvature about matching a second curvature of the curved section of material; and connecting a second leading edge to the T-seal opposite the leading edge such that the T-seal seals a gap between the leading edge and the second leading edge.

18. The method of claim 17, further comprising:

the first flange forming a first inset sunk into a first end of the spar and the second flange forming a second inset sunk into a second end of the spar;

placing a first thermal protection tile in the first inset; and placing a second thermal protection tile in the second inset.

19. A leading edge of a wing for an aircraft, such that the leading edge comprises:

a plurality of leading edge sections arranged along the wing so as to define its leading edge, such that each section of the plurality of leading edge sections respectfully comprises:

one end configured to rigidly mount to a spar of the wing; and an opposite end of each section configured to slidably mount to the spar so as to allow unimpeded expansion of each leading edge section along the wing into a gap defined between adjacent leading edge sections; and a t-seal disposed between the adjacent leading edge sections and configured to cover the gap therebetween.

20. The leading edge of claim 19, wherein the T-seal is slidably mounted to one end of each edge section.

* * * * *